(12) United States Patent
Bourne et al.

(10) Patent No.: US 6,574,975 B2
(45) Date of Patent: Jun. 10, 2003

(54) DUAL EVAPORATIVE PRE-COOLING SYSTEM AND METHOD THEREFOR

(75) Inventors: Richard C. Bourne, Davis, CA (US); Marshall B. Hunt, Davis, CA (US)

(73) Assignee: Davis Energy Group, Inc., Davis, CA (US)

(*) Notice: Subject to any disclaimer, the term of this patent is extended or adjusted under 35 U.S.C. 154(b) by 0 days.

(21) Appl. No.: 10/021,428

(22) Filed: Dec. 19, 2001

(65) Prior Publication Data

US 2002/0073720 A1 Jun. 20, 2002

Related U.S. Application Data

(60) Provisional application No. 60/256,474, filed on Dec. 20, 2000.

(51) Int. Cl.[7] .............................. F28D 3/00; F28D 5/00
(52) U.S. Cl. ........................................... 62/171; 62/305
(58) Field of Search .................... 62/171, 305, 310, 62/201, 91, 95

(56) References Cited

U.S. PATENT DOCUMENTS

| | | | | |
|---|---|---|---|---|
| 4,137,058 A | * | 1/1979 | Schlom et al. | 62/121 |
| 5,193,352 A | * | 3/1993 | Smith et al. | 62/90 |
| 5,724,828 A | * | 3/1998 | Korenic | 62/305 |
| 5,816,318 A | * | 10/1998 | Carter | 165/110 |
| 6,176,305 B1 | * | 1/2001 | Haglid | 165/231 |
| 6,418,728 B1 | * | 7/2002 | Monroe | 62/3.2 |

* cited by examiner

Primary Examiner—Melvin Jones
(74) Attorney, Agent, or Firm—Oliff & Berridge, PLC

(57) ABSTRACT

A dual evaporative pre-cooling system is installed packaged air conditioning units. The dual evaporative pre-cooling system includes an evaporative media disposed in a housing through which incoming condenser air flows. A water distribution device is disposed above the evaporative media. A sump and a pump are located below the evaporative media to recirculate water through the water distribution device and a ventilation air pre-cooling coil. A plurality of pipes connect, and allow circulation of, a water source discharged from the pump through the ventilation air pre-cooling coil, and to the water distribution device.

17 Claims, 2 Drawing Sheets

DUAL EVAPORATIVE PRE-COOLING SYSTEM AND METHOD THEREFOR

CROSS-REFERENCE TO RELATED APPLICATION

This application claims the benefit of U.S. Provisional Application No. 60/256,474, filed on Dec. 20, 2000.

BACKGROUND OF THE INVENTION

1. Field of Invention

This invention relates to improvements in evaporative pre-cooling devices, and particularly to a device that uses a dual evaporative cooling system to improve the efficiency and reduce electrical demand of packaged rooftop cooling systems frequently used on non-residential buildings.

2. Description of Related Art

A majority of new low-rise non-residential buildings in the United States are cooled with packaged rooftop units (RTU's). A RTU can include a number of components, e.g., one or more compressors, a condenser section that includes one or more air-cooled condensing coils, condenser fans, an evaporator coil, a supply blower, an intake location for outdoor ventilation air (with or without an "economizer" to fully cool from outdoor air when possible), optional exhaust air components, and controls. These components are packaged alike by manufacturers to be air cooled. Conventional modes for packaging fail to take advantage of the opportunity to improve efficiency and reduce electrical demand through evaporative condenser cooling. This opportunity is particularly significant in dry climate locations such as in California, where more than 1,000,000 air-cooled RTU's were operating as of the year 2000.

In climates where summer afternoon temperatures routinely reach 95° F. and higher, but with dry air such that wet bulb temperatures rarely exceed 70° F., RTU cooling efficiencies can be increased by 20% to 25% using an evaporative condenser air pre-cooler (ECAP). ECAP's have been available for many years but have not achieved widespread success. Their low sales volume results in part from their added maintenance requirements and in part from the failure of RTU manufacturers to market them. RTU manufacturers have been reluctant to market accessories that appeal to regional markets, especially if those accessories require added maintenance. Strategies that reduce ECAP maintenance requirements and clearly demonstrate favorable economics could substantially enlarge the ECAP market.

High maintenance requirements that have typically plagued ECAP's result from: hard water deposits, entry of insects and debris, difficult access to key operating components, and biological growth that fouls water feed components. Hard water deposits result from calcium and magnesium in the supply water that concentrate as pure water evaporates. These minerals firmly adhere to piping and evaporative media surfaces, reducing flow rates, clogging water distribution headers, and causing deterioration of the economical rigid evaporative media materials. The entry of bugs and debris also contribute to the disadvantages associated with RTU's without ECAP's. Periodic cleaning of condenser coils is required to maintain efficient operation. Evaporative media panel cleaning is complicated by conventional designs. For example, removal of an evaporative media panel is required from the top, where the water distribution header interferes and therefore must also be removed. An ECAP reduces condenser coil cleaning frequency, but its own maintenance requirements are seldom credited for the coil cleaning savings. Biological (algae) growth typically occurs in locations that remain continuously wet, as is true of ECAP sumps. These maintenance issues for traditional ECAP's offer a clear opportunity to enlarge the market using features that significantly reduce maintenance requirements.

The ECAP market has also been limited by a disconnect between purchasers and maintainers. ECAP's are usually purchased by management based on a payback analysis prepared by the seller. After installation, the ECAP becomes the responsibility of a maintenance staff or a contractor who seldom pays the energy bill and therefore has little idea of the ECAP value. Monitoring of savings is typically expensive and therefore avoided. As a result, many ECAP's are removed and considered a failure after a few years in use. This recurring scenario suggests an opportunity for improved designs with economical on-board monitoring and diagnosis electronics.

A major untapped opportunity afforded by RTU design is evaporative pre-cooling of ventilation air. At least 10% of the supply air delivered by RTU's is typically outdoor air needed for building ventilation. In some cases, particularly for laboratory facilities, RTU's deliver 100% outdoor air. In warm weather, cooling of ventilation air represents a significant fraction of the total cooling load. In the driest climates, ventilation air can be pre-cooled by the same direct evaporative process used in ECAP's. However, in most applications an indirect process that adds no moisture to the ventilation air is preferred.

Another opportunity afforded by RTU evaporative pre-cooling is reduction of fan energy consumption. On the condenser side, RTU's use high airflow rates to compensate for their air-cooled design. And, on the evaporator side, RTU's typically send indoor air through a contorted path as it is drawn up through return ducts into the RTU, around several tight turns inside the unit, and back down through supply ductwork. The added pressure drop associated with this complex path results in high fan energy consumption that penalizes the system all year, particularly in widely-used constant-speed systems. These high fan speeds are required during peak cooling load conditions. Applying evaporative air pre-cooling to both condenser and evaporator sides allows reduced fan speeds that generate full-year fan energy savings.

In recent years several new RTU pre-cooler products use a non-recirculating water feed system without a pump or a sump. In these lower-cost systems, water from a pressurized source is fed over the evaporative media as needed in response to a moisture sensor at the bottom of the evaporative media. Excess water that reaches the bottom is drained away. These systems have three disadvantages. First, they cannot circulate evaporatively-cooled sump water to a ventilation air pre-cooling coil. Second, they typically use more water than recirculating systems because of their constant drainage. Third, they are more susceptible to fouling with hard water deposits because all hardness minerals are left on the pads of the rigid evaporative media.

These disadvantages suggest a need and opportunity for dual evaporative pre-cooling systems that are capable of fitting both new and existing packaged rooftop cooling units, reducing maintenance requirements, and pre-cooling both condenser and ventilation air, thus facilitating reduced fan operating speeds. In addition, there is a need for a dual evaporative pre-cooling system that can diagnose operation and report energy savings to building owners, operators, electric utilities and any other party responsible for the operation thereof.

SUMMARY OF THE INVENTION

The present invention addresses the problems set forth above. The present invention is directed to dual evaporative pre-cooling systems for use as accessories on packaged rooftop cooling units that satisfy the above needs. An exemplary dual evaporative pre-cooling system according to the invention includes one or more evaporative condenser air pre-cooling panels, one or more water sumps, one or more water pumps, an indirect ventilation air pre-cooling coil, a supply pipe from at least one pump to the indirect ventilation air pre-cooling coil, a return pipe from the indirect ventilation air pre-cooling coil to the evaporative condenser air pre-cooling panels, a refill system to replace evaporated water, a motorized valve or second pump to purge and discharge sump water for maintenance purposes, an electrical power supply, and a control system to control and monitor system operations.

Another aspect of the invention is to provide a dual evaporative pre-cooling system for packaged air conditioning units. The dual evaporative pre-cooling system includes an evaporative media disposed in a housing with an air entry side through which incoming air flows. A water distribution device is disposed above the evaporative media. A sump and a pump are located in the housing below the evaporative media. The pump recirculates water through the water distribution device. A ventilation air pre-cooling coil and a plurality of pipes are connected together to allow circulation of a water source discharged from the pump through the ventilation air pre-cooling coil, and to the water distribution device.

According to the invention, each evaporative condenser air pre-cooling panel includes a structural frame, a rigid evaporative media contained within the frame, a water distribution header above the evaporative media, and an inlet screen that prevents insects and debris from entering the system. At least one (primary) evaporative condenser air pre-cooling panel includes a sump disposed below the evaporative media that contains enough water to ensure continuous pump operation without running dry. Other panels may be secondary panels, without sumps, that drain to the sump of the primary evaporative condenser air pre-cooling panel. In an exemplary embodiment, all of the water pumped from at least one of the sumps is delivered through the indirect ventilation air pre-cooling coil before circulating to at least one of the water distribution headers. In alternate exemplary embodiments, a pumped flow of water can be apportioned between the indirect ventilation air pre-cooling coil and at least one of the distribution headers, such that some of the water can bypass the coil and flow directly to the distribution headers, or some of the water can return directly to the sump from the indirect ventilation air pre-cooling coil, bypassing the distribution headers.

In an exemplary embodiment, each distribution header includes of a horizontal pipe perforated with a linear hole pattern. To ensure uniform water distribution on the top of the evaporative media, water is discharged upward from the horizontal perforated pipe against an underside of a semi-cyclindrical distributor surface. The sprayed water ricochets randomly into a widely-dispersed pattern that fully wets the evaporative media.

To prevent freeze-damage, the indirect coil and connecting pipes are designed to drain water back to the sump when the pump is not operating. Drainage is facilitated by a submersible pump with a vertical-axis impeller that delivers water through an upward-sloping pipe to a bottom inlet of a vertical supply manifold in the ventilation air pre-cooling coil. The indirect ventilation air pre-cooling coil can be provided with all horizontal serpentine circuits in parallel. The horizontal serpentine circuits of the ventilation air pre-cooling coil discharge into a vertical return manifold with top outlet. From the indirect ventilation air pre-cooling coil discharge, no "traps" are permitted before the water emerges from the perforated pipe. When pumped flow stops, air entering the perforated pipe allows water in the indirect ventilation air pre-cooling coil and in the pipes to drain back to the sump. The sump is discharged either by opening a drain valve or activating a pump-out cycle.

In an exemplary embodiment, the water refill system includes: a pressurized water supply line, a solenoid valve, a float switch, and a controller to operate the water refill system. This exemplary embodiment is used in conjunction with controls that limit biological growth by regularly discharging the sump. According to the invention, a control/monitoring system includes the controller (e.g., a microprocessor controller) with a time clock and temperature sensors that detect: an outdoor air, an evaporatively pre-cooled air, a building return air, the sump water, and a return water from the ventilation air precooling coil. Based on at least these five temperature inputs, pre-programmed building operating schedule data, and a cooling demand on the RTU, the controller can decide when to operate the evaporative pre-cooler system to maximize energy savings. The controller also uses this data in conjunction with power monitoring input data to compute and report energy savings, and to diagnose potential operating problems.

BRIEF DESCRIPTION OF THE DRAWINGS

The invention will be described in detail with reference to the following drawings in which like reference numerals refer to like elements and wherein.

DETAILED DESCRIPTION OF EXEMPLARY EMBODIMENTS

Figure 1:
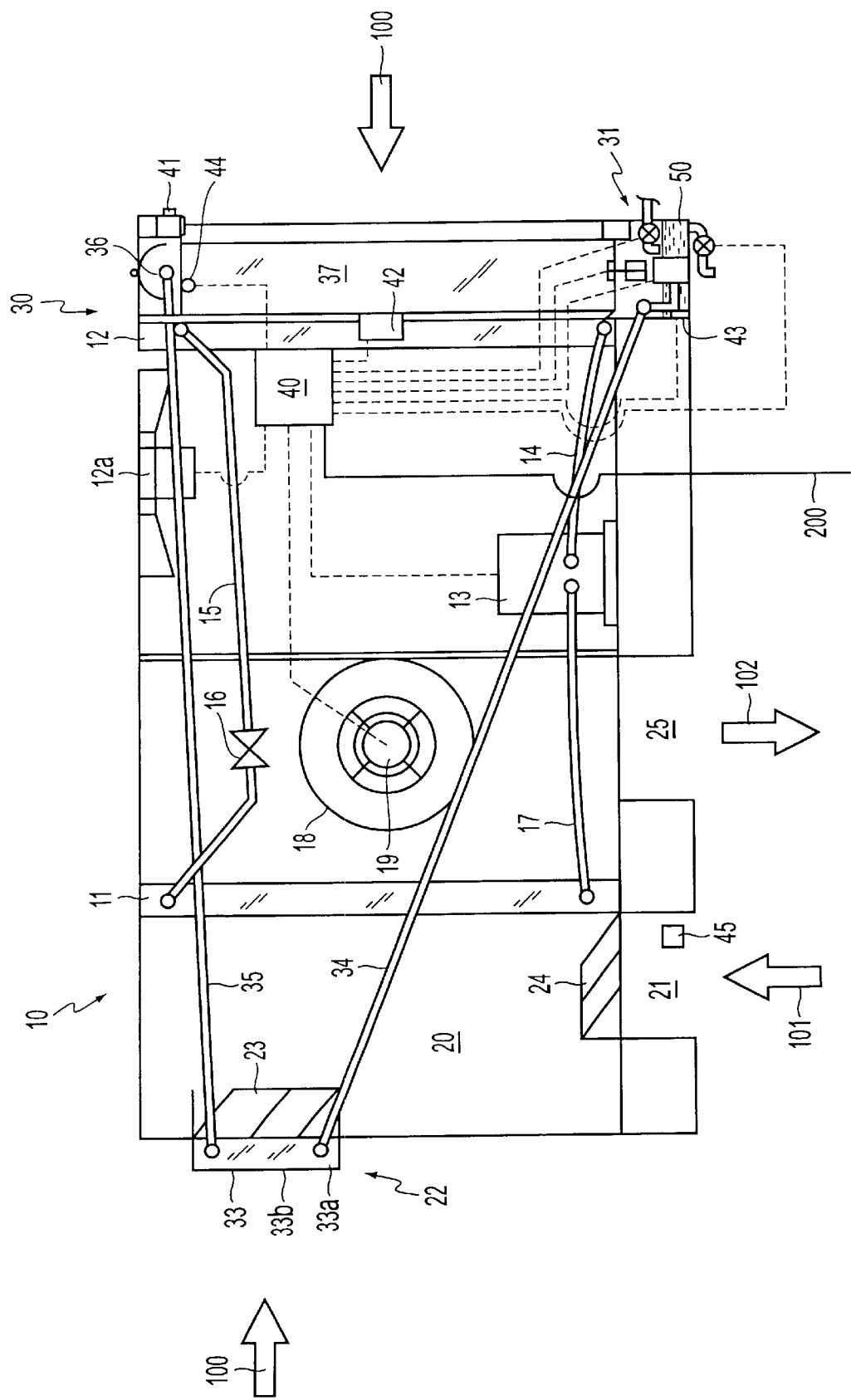
FIG. 1 shows a cross sectional view of a rooftop cooling unit with a dual evaporative pre-cooling system according to an exemplary embodiment of the present invention.
Figure 2:
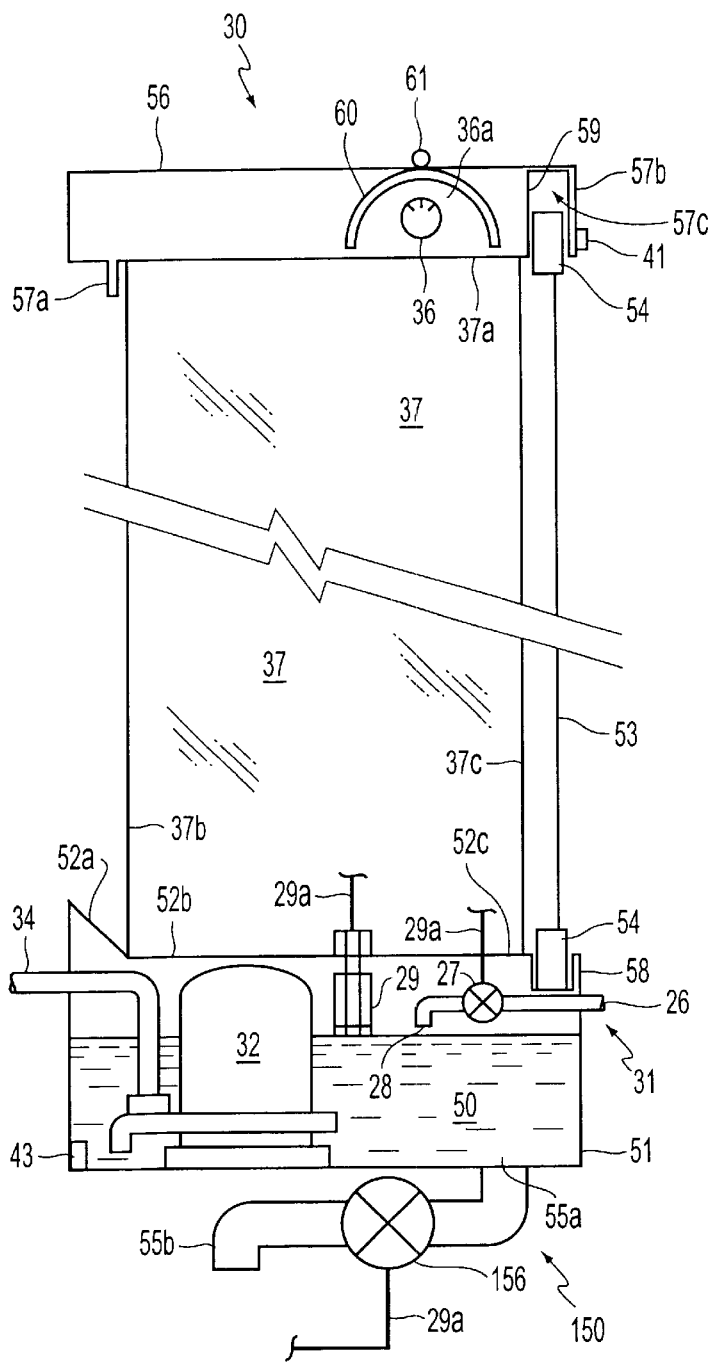
FIG. 2 shows an enlarged cross-sectional view of the condenser air pre-cooling panel of the exemplary embodiment shown in FIG. 1.

An exemplary embodiment of the present invention is described hereafter, with reference to FIGS. 1 and 2.

FIG. 1 shows an exemplary embodiment of a schematic cross-sectional view of a rooftop cooling unit (RTU) 10 including a dual evaporative pre-cooling system according to the present invention.

The RTU 10 includes a refrigeration-based cooling system including: an evaporator coil 11, a condensing coil 12, a compressor 13, an expansion device 16, and connecting refrigerant lines 14, 15, and 17. Included in the RTU is a condenser fan 12a and a supply blower 18. In operation, a hot refrigerant gas compressed by a compressor 13 flows through refrigerant line 14 into the condenser coil 12. The condenser fan 12a pulls outdoor air 100 across the condenser coil 12. Since the outdoor air 100 is cooler than the hot gas refrigerant entering the condenser coil 12, the gas is condensed to a pressurized liquid refrigerant and leaves the condenser coil 12 through the refrigerant line 15. In refrigerant line 15, the pressurized liquid refrigerant passes through expansion device 16, where the pressure of the pressurized liquid refrigerant is reduced. The liquid refrigerant then enters the evaporator coil 11, where the liquid refrigerant cools as it flashes to a vapor state (refrigerant vapor). A variable mixture of outdoor air 100 and return air 101 is drawn across the evaporator coil 11 by the supply blower 18. The supply blower 18 is driven by the blower motor 19. The cooled refrigerant cools the air drawn across the evaporator coil 11. The refrigerant vapor leaves the evaporator coil 11 through the refrigerant line 17 and returns to the compressor 13, where the refrigerant begins another cycle.

Return air 101 from the building enters a mixing zone 20 from a return duct 21 through a return damper 24. A return air temperature sensor 45 disposed in the return duct can be used to create a more accurate estimate for cooling energy savings. Outdoor air 100 enters the mixing zone 20 through an inlet 22 and an outdoor damper 23. The percentage of outdoor air 100 to return air 101 is controlled by movement of the outdoor damper 23 and the return damper 24. Most RTU's are equipped for adjustable outdoor air percentages from 0% to 100%. The variable mixture of outdoor air 100 and return air 101 pulled by the supply blower 18 across (and cooled by) the coil 11 is delivered as supply air 102 to the building through a supply duct 25.

According to this invention, an exemplary dual evaporative pre-cooling system is included with the RTU. The dual evaporative pre-cooling system includes a condenser air pre-cooling panel 30 with a sump 50 and a water refill system 31, an indirect ventilation air pre-cooling coil 33, a supply pipe 34, a return pipe 35 (connecting distribution pipes), a media distribution header 36, and a controller 40. As further described with reference to FIG. 2, the major component of the pre-cooling panel 30 is an evaporative media 37. The evaporative media 37 is wetted at the top with water from the distribution header 36. The water cools evaporatively while it drains downward through the evaporative media 37 and is collected at the bottom in the sump 50. A submersible pump 32 is located in the sump 50, and delivers cooled sump water through the supply pipe 34 into the bottom of the ventilation air pre-cooling coil 33. After passing through the ventilation air pre-cooling coil 33, where it cools incoming outdoor air 100, the water returns to the distribution header 36 through supply pipe 35.

In climates where outdoor air temperature may fall below freezing, the ventilation air pre-cooling coil 33, the supply pipe 34, the return pipe 35, and the distribution header 36 can be configured to drain the water when the submersible pump 32 stops operation. Thus, the supply pipe 34 is configured to slope continuously upward from the submersible pump 32 to the ventilation air pre-cooling coil 33, and both the ventilation air pre-cooling coil 33 and the return pipe 35 are configured to be free of traps that would prevent drainage. The distribution header 36 is perforated for drainage. When the submersible pump 32 stops operating, air enters the distribution header 36 to replace water draining by gravity back to the sump 50. The design of the ventilation air pre-cooling coil 33 is configured to promote drainage. Water enters adjacent the lowest point on a vertical supply header 33a, and then proceeds either horizontally or upward through serpentine coil tubes (not shown) before flowing into a vertical return header 33b. To facilitate drainage, the return pipe 35 is connected adjacent the top of the vertical return header 33b.

According to the exemplary embodiment, the controller 40 monitors and controls operation of the dual evaporative pre-cooling system based on cooling requests from a building thermostat (not shown), and temperature conditions sensed by at least one sensor, which will be described later. Various exemplary embodiments for the dual evaporative pre-cooling system are possible. In one embodiment, a pre-cooling operation occurs only when the building thermostat calls for a compressor 13 operation, after which the controller 40 causes the sump 50 to fill as will be further discussed with reference to FIG. 2. When the sump 50 is full, the controller 40 activates the submersible pump 32 to deliver water in the sump 50 through the ventilation air pre-cooling coil 33 and the distribution header 36 before wetting the evaporative media 37. The evaporative process has a dual effect, cooling both the air flowing across the condenser coil 11 and the water from the sump 50. The submersible pump 32 continues to operate until operation of compressor 13 has stopped. When the submersible pump 32 has not operated for a predetermined period (e.g., four hours), the controller 40 causes the sump 50 to be emptied as will be further discussed with reference to FIG. 2.

According to this invention, the controller 40 performs many control and diagnostic functions in response to sensing a variety of different conditions. Using input signals received from an outdoor air sensor 41, the controller operates the submersible pump 32, and optionally the condenser fan 12a, even when compressor 13 is not operating. If the outdoor air 100 is warmer than a preset threshold temperature (e.g., 60 F.), the dual evaporative pre-cooling system can delay the need for operation of the compressor 13 by pre-cooling the supply air 102 even though the building thermostat has not yet sensed a cooling load. Additional sensors can be provided to detect many conditions for input to the controller 40 including, but not limited to, measuring energy savings and diagnose operating problems.

For example, a pre-cooled air sensor 42 can be used to measure both energy savings and to assist in diagnosing operating problems. When the submersible pump 32 has been operating for a sufficient time long enough to fully wet the evaporative media 37, the controller 40 can report an operating error, and request a service call if the pre-cooled air sensed by the pre-cooled air sensor 42 is not cooler than the outdoor air 100 sensed by the outdoor air sensor 41. And, inputs signals received by the controller 40 from the outdoor air sensor 41 and the pre-cooled air sensor 42 can be used in conjunction with other known cooling performance parameters to compute energy savings produced by the condenser air pre-cooler. For example, the microprocessor can use an algorithm that computes "base case" and "pre-cooled" compressor energy use as a function of condenser inlet air temperature, and based on an assumed indoor air temperature. A base case is defined as an evaporative pre-cooling device without dual evaporative pre-cooling. The program can then subtract and integrate pre-cooled energy use from base case energy use to compute total energy savings that derive from the pre-cooled condenser air.

Approximate energy savings produced by the ventilation air pre-cooling operation can be estimated based on a water flow rate determined in laboratory tests and a water temperature rise computed by subtracting the reading of temperature sensor 43 in the water sump 50 from a reading of a coil return water temperature sensor 44. This temperature rise multiplied by the flow rate times a predetermined constant equals heat removed from the ventilation air by the ventilation air pre-cooling coil 33. Total cooling energy savings can then be approximated by adding the condenser air and ventilation air savings in thermal units (such as British thermal units or "Btu's"), converting to electrical energy units saved based on known efficiency for the RTU, and subtracting parasitic energy consumption of the submersible pump 32 based on run time as tracked by the controller 40. Approximate efficiency of the pre-cooling system can be computed by dividing total energy savings by parasitic energy consumption of the submersible pump 32. For example, the total cooling energy savings in Btu's over a one month period can be divided by the pump energy consumption over the same period in kWh to generate an energy efficiency ratio (EER) in Btu's/kWh for the dual evaporative pre-cooling system. This EER may be directly compared to EER's for the RTU and other cooling systems. While these values are approximate, they are suitably accurate for reporting system savings. According to these approximations, air and water flow rates are assumed not to vary with time.

The dual evaporative pre-cooling system is provided with a communication link 200 connected to the controller 40 for transmitting conditions monitored and computed by the controller 40 for reporting operation data information about the dual evaporative pre-cooling system to any known or later developed device that can transmit information, including but not limited to, a radio communication system, a telephone system, and an Internet connection system, in order to report operation data information about the dual evaporative pre-cooling system. The communication link 190 can be any known or later developed communication link.

FIG. 2 shows an enlarged cross-sectional view of the condenser air pre-cooling panel 30 according to the present invention. As mentioned with reference to FIG. 1, outdoor air 100 proceeds from right to left through the condenser air pre-cooling panel 30. The distribution header 36 distributes water along a top edge panel 37a of the evaporative media 37 and the water drains downward into the sump 50. The water is delivered though the supply pipe 34 to the ventilation air pre-cooling coil 33 by the submersible pump 32. Supply pipe 34 is located above the water level to minimize the danger of leakage. A solenoid valve 27 fills the sump 50 and re-supplies water as it is evaporated.

The structure of condenser air pre-cooling panel 30 includes of a bottom container 51 connected by side panels (not labeled) to a top cover 56. The bottom container 51 includes at its upper left side, sloping surface 52a to drain any water droplets falling from the evaporative media 37 back into the sump 50. A horizontal ledge 52b extends inward from the sloping surface 52a to support a rear edge 37b of the evaporative media 37. The sloping surface 52a is steep enough (e.g., 45 degrees) to prevent fan suction created by the condenser fan 12a from drawing the evaporative media 37 inward. The bottom container 51 includes at its right edge a trough 58 with an inward horizontal extension 52c to support a front edge 37c of the evaporative media 37.

Figure 3:
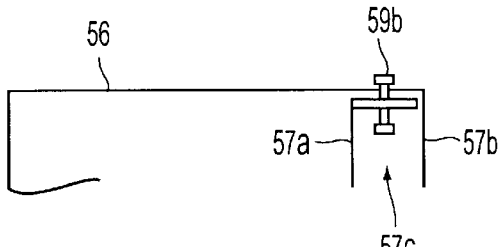
FIG. 3 shows an enlarged cross-sectional view of another aspect of an open-bottomed slot as shown in FIG. 2.

The top cover 56 includes, disposed at a left side, a vertical evaporative media stop 57a. The right side of the top cover 56 includes an open-bottomed slot 57c. The open-bottomed slot 57c is deeper than the trough 58 by at least the depth of the trough 58. The open-bottomed slot 57c is formed by a first vertical surface 57b, a second vertical surface 59 and on top by the top cover 56. The open-bottomed slot 57c can be made integral with the top cover 56 or from separate elements. For example, FIG. 3 shows the open-bottomed slot 57c being configured from separate elements. As a combination of separate elements, the open-bottomed slot 57c includes a vertical surface 57b that combines with an angle 59a secured to the top cover 56 by a fastener 59b (e.g., a rivet). According to this aspect of the invention, the open-bottomed slot 57c is easy to fabricate.

A screen 53, lined by a screen frame 54, is inserted into the trough 58 at a lowermost end and the open-bottomed slot 57c at an uppermost end. The height of the screen frame 54 is configured to be easily inserted into the open-bottomed slot 57c of the cover top 56 and to be held without fasteners. To insert the screen 53, the top of the screen frame 54 is inserted and slid fully upward into the open-bottomed slot 57c to permit the bottom of the screen frame 54 to clear its bottom edge and drop downward into the trough 58. The top of the screen frame 54 is then retained by the front edge 57b of the top cover 56.

The evaporative media 37 includes a relatively rigid assembly of treated corrugated paper layers in an alternating configuration that maximizes evaporative contact between air and water, with relatively low pressure drop for air passing through the evaporative media 37. Various alternatives are possible according to the invention. For example, a more expensive alternate rigid evaporative media of similar configuration but produced from corrugated fiberglass layers with enhanced fire-resistance can be used. The alternating corrugated layers typically slope (e.g., 45 degrees) downward toward an air entry side, and at a lesser (e.g., 15 degree) downward slope toward an air exit side. This sloping bias causes water flowing downward to counteract the tendency of the inward air flow to carry water droplets off the back side of evaporative media 37.

As shown in FIG. 2, the distribution header 36 has small holes 36a (e.g., ⅛" diameter) uniformly spaced (e.g., 2 inches apart) along its top side. Water returning from the ventilation air pre-cooling coil 33 and through the distribution header 36 sprays upwards through holes 36a disposed against the underside of a reflector 60. The reflector 60 is a half-cylinder of diameter, e.g., approximately three times the diameter of the distribution header 36. The distribution header 36 is secured by fasteners 61 to the underside of the top cover 56. The reflector 60 distributes water relatively uniformly downward onto the top of the evaporative media 37. The diameter of the reflector 60 can be, e.g., approximately half the thickness of the evaporative media 37. The distribution header 36 and the reflector 60 can be located closer to the outdoor air entry side (e.g., the right) of the evaporative media 37 than to the outdoor air exit side (e.g., the left).

A water refill subsystem 31 is located in the bottom container 51 of the condenser air pre-cooling panel 30. The water refill subsystem 31 includes a supply pipe 26, a solenoid valve 27, a spout 28, a float switch 29, and control wires 29a connected to the controller 40. A sump purge assembly 150 is connected to the bottom container 51 and includes a flush exit port 55a, a drain valve 156, and a discharge line 55b. The solenoid valve 27 is automatically opened when the system is operating and the float switch 29 indicates that the water level in the sump 50 is low.

To begin a cooling cycle, the controller 40 closes the drain valve 156 and activates the solenoid valve 27 until the float switch 29 indicates that the sump 50 is full. When the submersible pump 32 has not operated for a predetermined length of time (e.g., 4 hours), the controller 40 opens the drain valve 156 to drain all of the water from the sump 50 through the discharge line 55b. The exit port 55a is located flush with the bottom of the sump 50 to assure that all water is drained from the sump 50. The exit from the spout 28 can be located at a position that prevents backflow, e.g., at least 2 inches above the water level in the sump 50. Signals between the controller 40, the float switch 29, and the solenoid valve 27 travel through the control wires 29a.

In the illustrated embodiment, the controller 40 is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

The controller 40 is also connected to receive signals and to control a variety of devices in the dual evaporative pre-cooling system, including but not limited to, the compressor 13, the blower motor 19, the condenser fan 12a, the coil return water temperature sensor 44, the pre-cooled air sensor 42, the solenoid valve 27, the float switch 29, the submersible pump 32, the temperature sensor 43 located in the sump water, the return air sensor 45, the drain valve 156 and any other device requiring control and receipt of a control signal. A utility input signal can also be received from the return air sensor 45 to signal the controller 40 to pre-cool the building in the morning to limit afternoon cooling loads.

The communication link 200 in FIG. 1 can be any known or later developed device or system for reporting operation data information about the dual evaporative pre-cooling system to any known or later developed device for transmitting information. The controller 40 may be connected via the communication link 200 to one or more of a direct cable connection, a radio transmission connection, a telephone line connection, a connection over a wide area network or a local area network, a connection over an intranet, a connection over the Internet, or a connection over any other distributed processing network or system. In general, the communication link 190 can be any known or later developed connection system. Further, it should be appreciated that the communication link 190 can be a wired or wireless link to a network. The network can be a local area network, a wide area network, an intranet, the Internet, or any other distributed processing and storage network.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, other combinations and configurations, including more, less or only a single element, are also within the spirit and scope of the invention.

What is claimed is:

1. A dual evaporative pre-cooling system for packaged air conditioning units comprising:
   a housing;
   an evaporative media disposed in the housing with an air entry side through which incoming air flows;
   a water distribution device disposed above the evaporative media;
   a sump and a pump located in the housing below the evaporative media, wherein the pump recirculates water through the water distribution device;
   a ventilation air pre-cooling coil; and
   a plurality of pipes to connect, and allow circulation of, a water source discharged from the pump through the ventilation air pre-cooling coil, and to the water distribution device.

2. The dual evaporative pre-cooling system according to claim 1, wherein the water discharged from the pump is delivered in series in the following order:
   first, from the sump through the ventilation air pre-cooling coil;
   second, through the water distribution device; and
   third, downward by gravity through the evaporative media and back into the sump.

3. The dual evaporative pre-cooling system according to claim 2, further comprising:
   at least one sensor that detects an operating parameter; and
   a controller that receives signals from the at least one sensor to monitor system operations and to report an operating performance.

4. The dual evaporative pre-cooling system according to claim 3, wherein the at least one sensor includes:
   a first temperature sensor that detects an outdoor air; and
   a second temperature sensor located between the evaporative media and the condenser to determine a temperature decrease in the dual evaporative pre-cooling system.

5. The dual evaporative pre-cooling system according to claim 4, wherein the at least one sensor includes:
   a water temperature sensor upstream of the ventilation air coil; and
   a water temperature sensor downstream of the ventilation air coil,
   wherein signals are received from the sensors by the controller to determine an quantity of ventilation air cooling by the ventilation air pre-cooling coil.

6. The evaporative pre-cooling system according to claim 5, wherein the controller transmits signals to at least one of: a radio system, a telephone system, and an Internet system, to report operation data information about the dual evaporative pre-cooling system.

7. An evaporative condenser air pre-cooling device for a rooftop unit having a condenser, comprising:
   a housing;
   an evaporative media disposed in the housing with an air entry side through which an incoming air flows;
   a water distribution device supported by the housing and disposed above the evaporative media through which a water source is distributed;
   means for controlling distribution of the water source;
   a controller, and
   a screen located on the air entry side of the evaporative media, wherein removal of the screen and removal of the evaporative media is permitted from the air entry side without moving the water distribution device or the housing.

8. The evaporative condenser air pre-cooling device according to claim 7, wherein the controller receives signals from at least one sensor to monitor system operations and to report an operating performance.

9. The evaporative condenser air pre-cooling device according to claim 8, wherein the at least one sensor comprises:

a first temperature sensor that detects an outdoor air; and a second temperature sensor located between the evaporative media and the condenser that determines a temperature decrease in the evaporative condenser air pre-cooling device.

10. The evaporative condenser air pre-cooling device according to claim 7, wherein the water distribution device includes a tube with perforations directed upward.

11. The evaporative condenser air pre-cooling device according to claim 7, wherein the evaporative media is supported on a lower portion of the housing by a horizontal flange bent inward from the housing, and wherein the horizontal flange is connected to the housing by an edge sloping downward from the housing to the horizontal flange such that the edge catches water droplets from a downstream side of the evaporative media.

12. A method for reducing the energy consumption of a rooftop air conditioning unit having a blower that supplies conditioned air, comprising:

adding an evaporative condenser pre-cooling device that increases the cooling capacity of the unit; and reducing the speed of the blower and thereby reducing the energy quantity used to drive the blower during operating hours.

13. The method according to claim 12, wherein the evaporative pre-cooling device reduces the temperature of the air discharged from the rooftop air conditioning unit.

14. The method according to claim 13, wherein the rooftop air conditioning unit further includes:

evaporatively cooling the air when a compressor is not being operated by controlling a pump and at least one condenser fan in the rooftop air conditioning unit.

15. A method for reducing the energy consumption in a rooftop air conditioning unit including a condenser, an evaporator, a compressor and a blower, the method comprising:

providing an evaporative condenser air pre-cooling device;

providing a ventilation air pre-cooling coil;

connecting the evaporative condenser air pre-cooling device to the ventilation air pre-cooling coil;

circulating a cooling fluid through the evaporative condenser air pre-cooling device and the ventilation air pre-cooling coil.

16. The method according to claim 15, wherein the cooling fluid is circulated in response to an instruction by a controller to operate a pump based on at least one operating parameter detected by at least one sensor.

17. The method according to claim 15, wherein the rooftop air conditioning unit further includes the step of:

evaporatively cooling the air when the compressor is not being operated by controlling a pump and at least one condenser fan in the rooftop air conditioning unit.

* * * * *